US012771064B2

(12) United States Patent
Ishikawa et al.

(10) Patent No.: US 12,771,064 B2
(45) Date of Patent: Oct. 20, 2026

(54) LEVER TYPE CONNECTOR

(71) Applicant: YAZAKI CORPORATION, Tokyo (JP)

(72) Inventors: Yoshinori Ishikawa, Makinohara (JP); Yuki Nakayama, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 340 days.

(21) Appl. No.: 18/624,055

(22) Filed: Apr. 1, 2024

(65) Prior Publication Data

US 2024/0356281 A1 Oct. 24, 2024

(30) Foreign Application Priority Data

Apr. 19, 2023 (JP) ................................ 2023-068346

(51) Int. Cl.
*H01R 13/629* (2006.01)

(52) U.S. Cl.
CPC .............................. *H01R 13/62933* (2013.01)

(58) Field of Classification Search
CPC ................................................ H01R 13/62933
USPC .......................................................... 439/345
See application file for complete search history.

(56) References Cited

U.S. PATENT DOCUMENTS 5,474,461 A * 12/1995 Saito ................ H01R 13/62933 439/351
5,695,349 A * 12/1997 Taguchi ........... H01R 13/62955 439/157
6,193,531 B1 * 2/2001 Ito .................... H01R 13/62938 439/372
2005/0245114 A1 * 11/2005 Shiga ............... H01R 13/62938 439/157
2011/0130026 A1 * 6/2011 Makino ............ H01R 13/62966 439/345
2014/0134862 A1 5/2014 Itou et al.
2020/0295509 A1 * 9/2020 Ochiai ............... H01R 13/6295
2024/0347697 A1 * 10/2024 Reichmann ....... H01M 10/0525
2024/0347967 A1 * 10/2024 Kobayashi ........... H01R 13/629

FOREIGN PATENT DOCUMENTS

JP H11-317255 A 11/1999
JP 2014-99267 A 5/2014
JP 2020-149811 A 9/2020

* cited by examiner

*Primary Examiner* — Tulsidas C Patel
(74) *Attorney, Agent, or Firm* — KENEALY VAIDYA LLP

(57) ABSTRACT

A lever member includes an operation portion disposed at an end portion of a moment arm at a position farthest from a rotation shaft, and an insertion/extraction support structure that rotates a housing in one direction from a first lever position in a fittable state and an extractable state to a second lever position in a completely fitted state to apply a connector fitting force, and rotates the housing in the other direction from the second lever position to the first lever position to apply a connector extraction force.

6 Claims, 11 Drawing Sheets

LEVER TYPE CONNECTOR

CROSS-REFERENCE TO RELATED APPLICATION(S)

The present application claims priority to and incorporates by reference the entire contents of Japanese Patent Application No. 2023-068346 filed in Japan on Apr. 19, 2023.

BACKGROUND OF THE INVENTION

1. Field of the Invention

The present invention relates to a lever type connector.

2. Description of the Related Art

Conventionally, in a fitting connector, there is a connector in which an insertion/extraction support structure for generating a fitting support force required for increasing a fitting force between connectors or an extraction support force required for increasing an extraction force between the connectors is provided in any one of the two connectors. For example, Japanese Patent Application Laid-open No. 2014-099267 and Japanese Patent Application Laid-open No. H11-317255 below disclose a lever type connector including a lever member (so-called LIF lever) as an insertion/extraction support structure as a connector with the insertion/extraction support structure.

Here, in the lever type connector, in order to maintain a quality of the lever member, it is desirable to hold the lever member at a predetermined position during conveyance or maintenance work so that a load is not applied to the lever member in a rotatable state. In the lever type connector of Japanese Patent Application Laid-open No. 2014-099267, the lever member can be protected by making the lever member stand by at a completely fitted position until immediately before attachment to a mating connector. The completely fitted position is a relative position of the lever member with respect to a housing when the lever type connector and the mating connector are in a completely fitted state (that is, when the lever type connector and the mating connector are in an energizable state). In this lever type connector, the lever member can be made to stand by at a standby position (completely fitted position) immediately before being attached to the mating connector by using a holding structure for holding the lever member in the housing in the completely fitted state. In addition, in the lever type connector of Japanese Patent Application Laid-open No. H11-317255, the lever member can be protected by setting a lever protection position across a position where the lever member is rotated from an insertable/extractable position to a side opposite to the completely fitted position and causing the lever member to stand by at the lever protection position. The insertable/extractable position is a relative position of the lever member with respect to the housing when the lever type connector and the mating connector are in a fittable state and when the lever type connector and the mating connector are in an extractable state (that is, when the lever type connector and the mating connector can start to be fitted and connected to each other in the completely fitted state, and the lever type connector and the mating connector can be separated from each other, and energization between the lever type connector and the mating connector cannot be performed). The lever type connector is provided with a temporary holding structure for holding the lever member at the lever protection position. The temporary holding structure holds the lever member at the lever protection position by fitting a locking protrusion of the housing into an arm portion of the lever member at the lever protection position.

Meanwhile, in the lever type connector of Japanese Patent Application Laid-open No. 2014-099267, the completely fitted position of the lever member is the standby position, and the holding structure of the lever member at the completely fitted position also serves as the temporary holding structure of the lever member at the standby position. Therefore, in this lever type connector, a holding force by the holding structure is high, and there is room for improvement if attention is paid to the operability of the lever member from the standby position. On the other hand, in the lever type connector of Japanese Patent Application Laid-open No. H11-317255, the lever protection position (standby position) of the lever member is set at a place deviated from a rotation locus of the lever member between the completely fitted position and the insertable/extractable position, and the holding force by the temporary holding structure can be set lower than that in Japanese Patent Application Laid-open No. 2014-099267, for example, so that the operability of the lever member from the standby position is improved. However, in this lever type connector, a locking projection of the housing has a shape such as a hemispherical bulging portion, and a diameter of the locking projection is reduced in order to minimize the holding force required for temporary holding. In this lever type connector, a frictional force is applied between the locking projection and the arm portion every time the operation of the lever member is repeated between the insertable/extractable position and the lever protection position. However, since the arm portion has higher rigidity than the locking projection due to a function of the lever member, the holding force between the locking projection and the arm portion may gradually decrease every time the operation is repeated.

SUMMARY OF THE INVENTION

Therefore, an object of the present invention is to provide a lever type connector capable of maintaining a holding force of a lever member at a lever protection position.

A lever type connector according to one aspect of the present invention includes a terminal fitting; a housing that accommodates the terminal fitting; and a lever member that is rotatable around an axis of a rotation shaft between the lever member and the housing and applies a connector fitting force or a connector extraction force accompanying the rotation between the lever member and a mating connector, wherein the lever member includes an arm portion rotatable around the axis of the rotation shaft, an operation portion as a force point connected to the arm portion and disposed at an end portion, at a position farthest from the rotation shaft, of a moment arm of the arm portion with the rotation shaft as a rotation center, and an insertion/extraction support portion that causes the connector fitting force to act on the mating connector by rotating the housing in one direction around the axis of the rotation shaft from a first lever position when the connectors are in a fittable state and in an extractable state to a second lever position when the connectors are in a completely fitted state, and causes the connector extraction force to act on the mating connector by rotating the housing in the other direction around the axis of the rotation shaft from the second lever position to the first lever position, the housing includes a lever protection portion that locks the operation portion at a lever protection position across a position where the lever member is rotated from the first lever position to a side opposite to the second lever position and prevents the lever member from excessively rotating across the lever protection position, the operation portion includes a first holding portion, and the lever protection portion includes a second holding portion that locks the first holding portion at the lever protection position and stops the lever member at the lever protection position.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a lever type connector according to the present invention will be described in detail with reference to the drawings. Note that the present invention is not limited by the embodiment.

Embodiment

One embodiment of a lever type connector according to the present invention will be described with reference to FIGS. 1 to 11.

Figure 1:
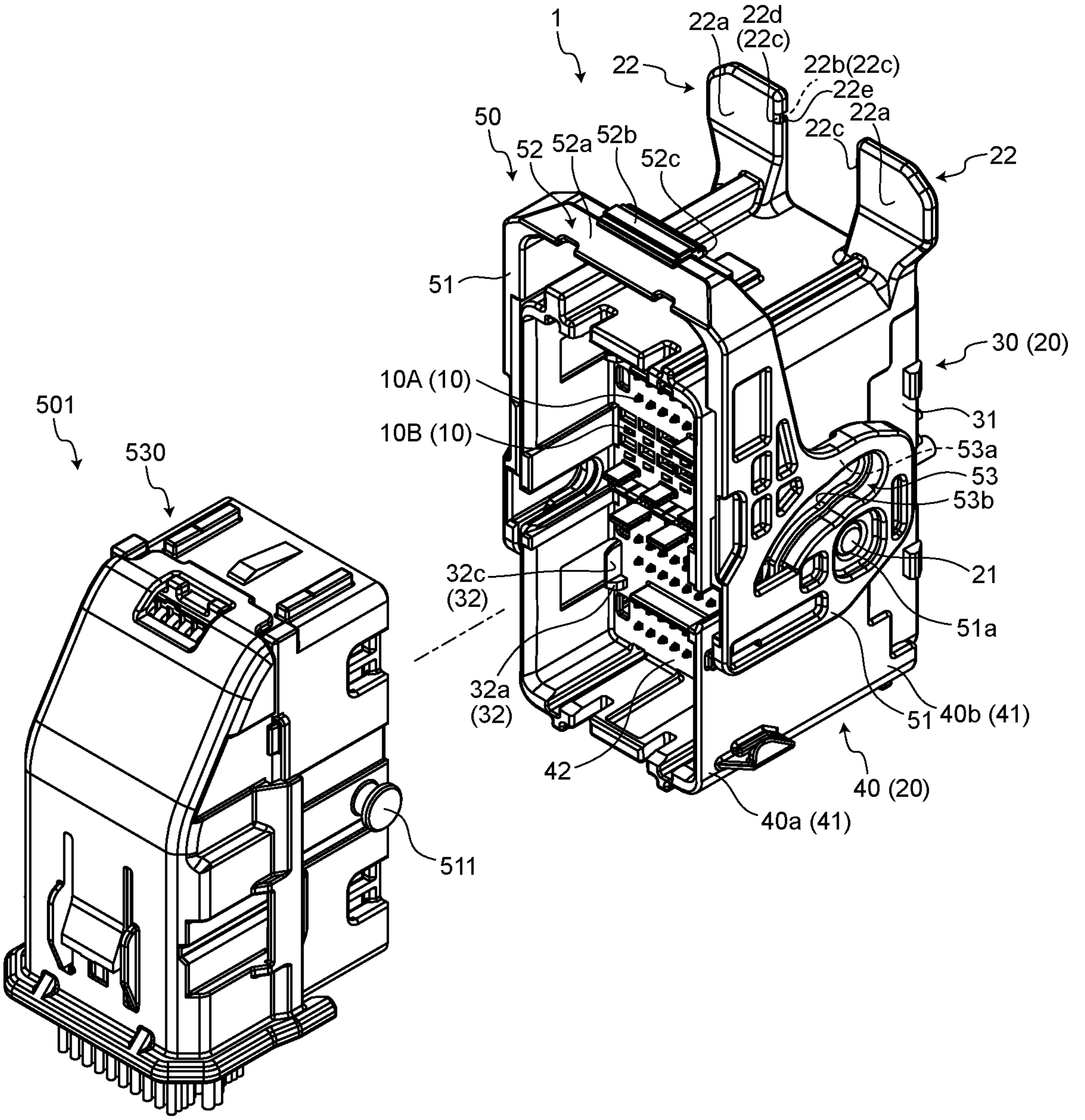
FIG. 1 is a perspective view before connector fitting connection illustrating a lever type connector and a mating connector according to an embodiment.

Reference numeral 1 in FIGS. 1 to 11 denotes a lever type connector of the present embodiment. A lever type connector 1 exemplified here is configured to be insertable into and extractable from a mating connector 501 (FIG. 1). The lever type connector 1 and the mating connector 501 are electrically connected to each other when those connectors (hereinafter, referred to as "the connectors") are in a completely fitted state, and are electrically disconnected from each other when the connectors are in an insertable/extractable state in which the connectors are in a fittable state and an extractable state. In the lever type connector 1 and the mating connector 501, when the connectors are in the insertable/extractable state, a lever member described later is rotated to generate a connector fitting force between the connectors at an insertable/extractable position, so that the connectors are fitted and connected to each other while relatively moving between the connectors to a completely fitted position at which the fitting is completed. In addition, in the lever type connector 1 and the mating connector 501, when the connectors are in the completely fitted state, the lever member is rotated to generate a connector extraction force between the connectors at the completely fitted position, so that the connectors are relatively moved to the insertable/extractable position where the connectors are in the insertable/extractable state. The lever type connector 1 and the mating connector 501 can be pulled apart and separated from each other in the insertable/extractable state.

Figure 2:
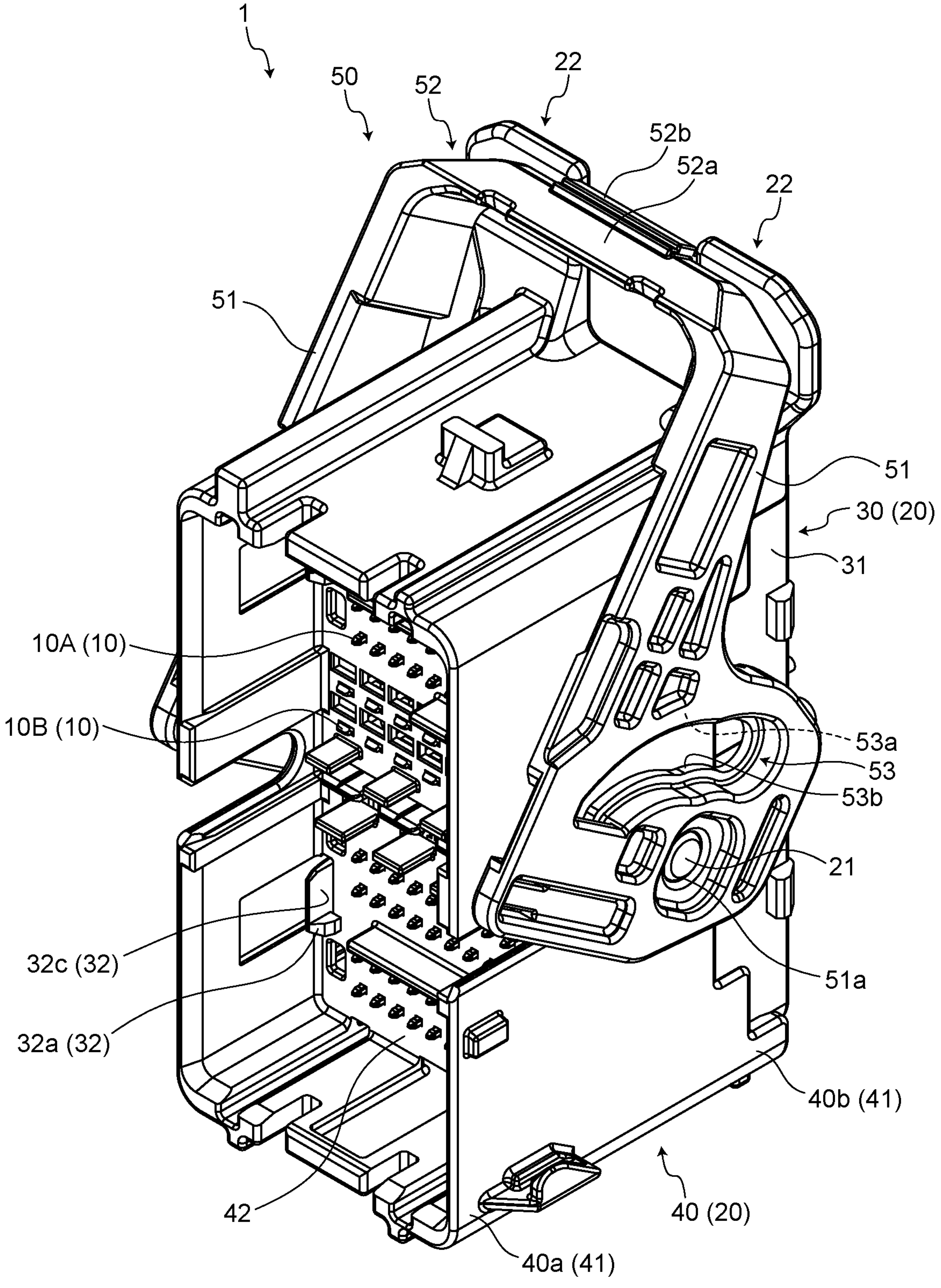
FIG. 2 is a perspective view illustrating a lever type connector at a lever protection position.
Figure 4:
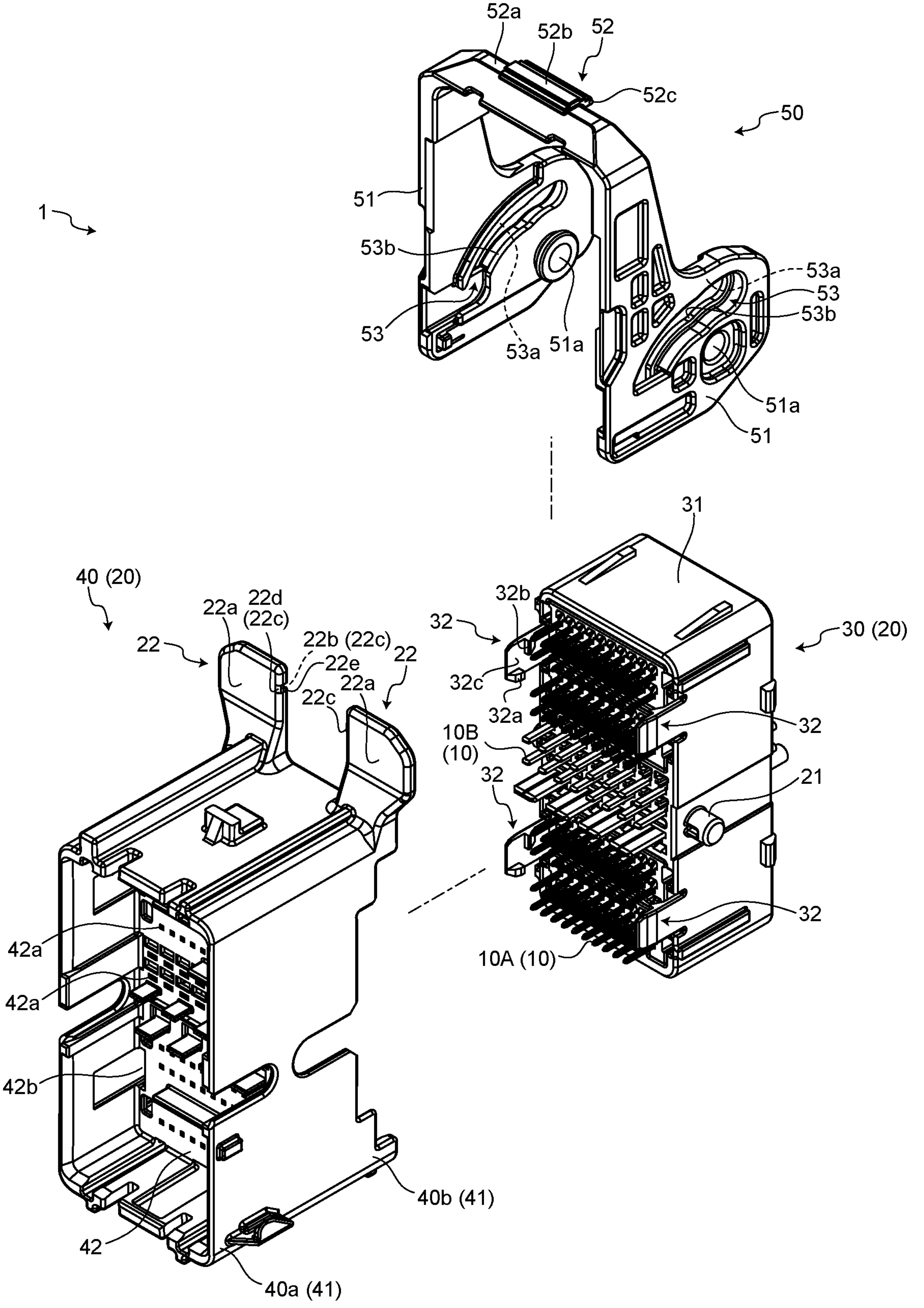
FIG. 4 is an exploded perspective view of the lever type connector divided for each main component.

The lever type connector 1 includes a terminal fitting 10 and a housing 20 that houses the terminal fitting 10 (FIGS. 1, 2, and 4).

The terminal fitting 10 is made of a conductive material such as metal. The terminal fitting 10 is fitted and connected to a mating terminal fitting (not illustrated) of the mating connector 501 to be physically and electrically connected to the mating terminal fitting. One of the terminal fitting 10 and the mating terminal fitting is molded as a female terminal fitting, and the other is molded as a male terminal fitting. The terminal fitting 10 exemplified here is roughly classified into a first male terminal fitting 10A whose terminal fitting portion with a mating terminal fitting is formed in a shaft shape and a second male terminal fitting 10B whose terminal fitting portion is formed in a piece shape (FIGS. 1, 2, and 4).

The housing 20 is made of an insulating material such as synthetic resin. The housing 20 exemplified here includes a frame member 30 that accommodates the terminal fitting 10 with the terminal fitting portion protruding, and a hood member 40 that has a cylindrical hood portion 40*a* into which the mating connector 501 is fitted and relatively moves the mating connector 501 along a cylinder axis direction between the insertable/extractable position and the completed fitted position in the cylinder, and relatively moves with respect to the frame member 30 between a first hood position (FIGS. 1 and 5) when the connectors are in the insertable/extractable state and a second hood position (FIG. 6) when the connectors are in the completely fitted state along the cylinder axis direction (FIGS. 1 to 7). In the housing 20, the relative movement between the frame member 30 and the hood member 40 is performed along with a rotation operation (hereinafter, referred to as "lever operation") of the lever member described later.

In the hood member 40, a mating frame member 530 (FIG. 1) of the mating connector 501 is fitted into the cylindrical hood portion 40*a* along the cylinder axis direction. Therefore, the mating frame member 530 is molded in an external shape matching a cylindrical shape of the hood portion 40*a*. The mating terminal fitting is accommodated in the mating frame member 530.

In the housing 20, the frame member 30 and the hood member 40 are assembled so as to be relatively movable along the cylinder axis direction (hereinafter, also referred to as "connector insertion/extraction direction") of the hood portion 40*a*. The hood member 40 includes a cylindrical frame housing portion 40*b* which is disposed coaxially with the hood portion 40*a*, and into which the frame member 30 is fitted and which relatively moves the frame member 30 along the connector insertion/extraction direction between the first hood position and the second hood position in the cylinder (FIGS. 1 to 7).

In the hood member 40, a frame main body 31 of the frame member 30 is fitted into the cylindrical frame housing portion 40*b* along the cylinder axis direction (FIGS. 1 to 8). Therefore, the frame main body 31 is molded in an external shape corresponding to the cylindrical shape of the frame housing portion 40*b*. The terminal fitting portion of the terminal fitting 10 is accommodated in the frame main body 31.

The hood member 40 illustrated here includes a cylindrical body 41 formed in a cylindrical shape, and a flat plate 42 disposed inside the cylindrical body 41 and partitioning an internal space of the cylindrical body 41 into one end side and the other end side in the cylinder axis direction (FIGS. 1, 2, 4, and 8). In the hood member 40, one end side of the cylindrical body 41 from the plate 42 is defined as the hood portion 40*a*, and the other end side of the cylindrical body 41 from the plate 42 is defined as the frame housing portion 40*b* (FIGS. 1, 2, 4, and 8). That is, the plate 42 is disposed at a boundary between the hood portion 40*a* and the frame housing portion 40*b*.

Through holes (hereinafter, referred to as "terminal insertion holes") 42*a* through which the terminal fitting portion of the terminal fitting 10 is inserted is formed in the plate 42 for each terminal fitting 10 (FIG. 4). In the plate 42, when the connectors are at the insertable/extractable positions and the hood member 40 is at the first hood position (FIGS. 1 and 5), a tip of the terminal fitting portion of the terminal fitting 10 is caused to enter the hood portion 40*a* through the terminal insertion holes 42*a*. Then, when the hood member 40 moves relative to the frame member 30 from the first hood position to the second hood position in accordance with the lever operation described later (FIG. 6), the plate 42 increases a protrusion amount of the terminal fitting portion of the terminal fitting 10 in the hood portion 40*a* to be larger than an initial protrusion amount at the first hood position. That is, the terminal insertion holes 42*a* of the plate 42 cause the tip of the terminal fitting portion of the terminal fitting 10 to enter the hood portion 40*a* at the first hood position, and causes the protrusion amount of the terminal fitting portion of the terminal fitting 10 in the hood portion 40*a* at the second hood position to be larger than that at the first hood position. Between the connectors, the terminal fitting portion of the terminal fitting 10 can be fitted and connected to the mating terminal fitting in the mating frame member 530 in the hood portion 40*a* at the second hood position. In addition, when the hood member 40 moves relative to the frame member 30 from the second hood position to the first hood position in accordance with a lever operation described later (FIGS. 1 and 5), the plate 42 returns the protrusion amount of the terminal fitting portion of the terminal fitting 10 in the hood portion 40*a* to the initial protrusion amount.

The frame member 30 is provided with flexible plate locking bodies 32 for locking the plate 42 at the first hood position at a plurality of positions (FIGS. 1, 2, 4, and 8). The plate locking body 32 locks the plate 42 at the first hood position and stops the hood member 40 at the first hood position.

Figure 8:
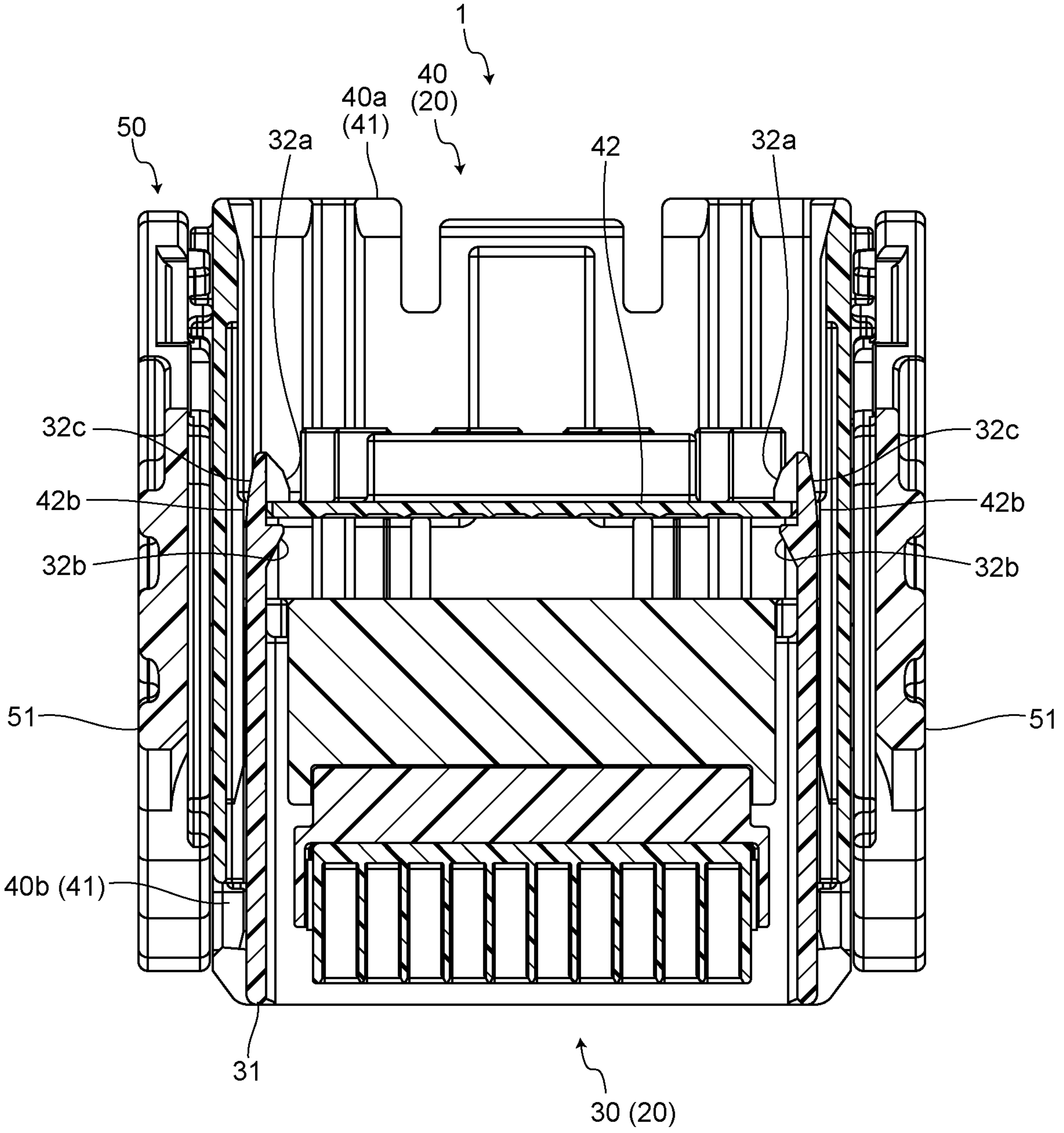
FIG. 8 is a cross-sectional view taken along line X1-X1 of FIG. 3.

The plate locking body 32 includes a first plate locking protrusion 32*a* and a second plate locking protrusion 32*b* that sandwich an end of the plate 42 in a plate thickness direction when the hood member 40 is at the first hood position (FIGS. 1, 2, 4, and 8). When the hood member 40 is at the first hood position, the first plate locking protrusion 32*a* is disposed in the cylinder of the hood portion 40*a*, and the second plate locking protrusion 32*b* is disposed in the cylinder of the frame housing portion 40*b* (FIGS. 1 and 8).

Further, the plate locking body 32 includes a plate locking piece portion 32*c* that causes the first plate locking protrusion 32*a* and the second plate locking protrusion 32*b* to protrude from an opposing wall disposed to oppose the end of the plate 42 and is bendably deformable in an opposing arrangement direction (FIGS. 1, 2, 4, and 8). The plate locking piece portion 32*c* is a cantilever piece portion protruding in the cylindrical axis direction from the frame main body 31 toward the plate 42 in the frame housing portion 40*b*. The plate locking body 32 has flexibility by the plate locking piece portion 32*c*.

Here, at an end of the plate 42, a through hole (hereinafter, referred to as "locking hole") 42*b* through which the plate locking body 32 is inserted is formed for each plate locking body 32 (FIGS. 1, 2, 4, and 8). The plate locking piece portion 32*c* causes the first plate locking protrusion 32*a* and the second plate locking protrusion 32*b* to protrude from an opposing wall disposed to oppose an inner peripheral surface of the locking hole 42*b*. The plate locking piece portion 32*c* illustrated here is formed in a flat plate piece shape, and causes the first plate locking protrusion 32*a* and the second plate locking protrusion 32*b* to protrude from a plane as the opposing wall.

When the hood member 40 moves relative to the frame member 30 from the first hood position (FIGS. 1 and 5) to the second hood position (FIG. 6) in accordance with the lever operation described later, the plate locking body 32 increases the projection amount of the plate locking piece portion 32*c* in the hood portion 40*a* to be larger than the initial projection amount at the first hood position. Therefore, in the plate locking body 32, when the hood member 40 moves relative to the frame member 30 from the first hood position to the second hood position, the plate locking piece portion 32*c* is bent in a direction of being separated from an inner peripheral surface of the locking hole 42*b* to release the sandwiching of the end portion of the plate 42 by the first plate locking protrusion 32*a* and the second plate locking protrusion 32*b*. For example, here, a plate locking release portion (not illustrated) for releasing a locked state of the end portion of the plate 42 by the plate locking body 32 is provided in the mating frame member 530, and when the mating frame member 530 relatively moves from the insertable/extractable position to the completely fitted position in the hood portion 40*a*, the plate locking release portion pushes and moves the first plate locking protrusion 32*a* to bend the plate locking piece portion 32*c* in a direction of being separated from the inner peripheral surface of the locking hole 42*b*.

When the hood member 40 moves relative to the frame member 30 from the second hood position (FIG. 6) to the first hood position (FIGS. 1 and 5) in accordance with the lever operation described later, the plate locking body 32 returns the projection amount of the plate locking piece portion 32*c* in the hood portion 40*a* to the initial projection amount. Therefore, in the plate locking body 32, when the hood member 40 moves relative to the frame member 30 from the second hood position to the first hood position, the plate locking piece portion 32*c* is bent in a direction of being separated from the inner peripheral surface of the locking hole 42*b* so that the end portion of the plate 42 is not caught by the first plate locking protrusion 32*a* and the second plate locking protrusion 32*b*. For example, here, when the mating frame member 530 relatively moves from the completely fitted position to the insertable/extractable position in the hood portion 40*a*, the plate locking release portion of the mating frame member 530 pushes and moves the second plate locking protrusion 32*b* to bend the plate locking piece portion 32*c* in a direction away from the inner peripheral surface of the locking hole 42*b*.

Here, an outer appearance shape of the frame main body 31 of the frame member 30 is formed in a rectangular parallelepiped shape (FIG. 4). In the hood member 40, the cylindrical body 41 is formed in a square cylindrical shape, and the plate 42 is formed in a rectangular flat plate shape (FIG. 4). In the hood member 40, the rectangular parallelepiped mating frame member 530 is fitted into the rectangular cylindrical hood portion 40*a*, and the rectangular parallelepiped frame main body 31 is fitted into the rectangular cylindrical frame housing portion 40*b*.

In the frame member 30 shown here, four plate locking bodies 32 are arranged close to the outer peripheral surface side of the frame main body 31 (FIG. 4). Two of the four plate locking bodies 32 are disposed with the opposing walls of the plate locking piece portion 32*c* facing each other, and the remaining two are disposed with the opposing walls of the plate locking piece portion 32*c* facing each other. Here, opposing walls of a pair of plate locking piece portions 32*c* are arranged to oppose each other in the axial direction of a rotation shaft 21 of the lever member 50 described later.

The lever type connector 1 includes a lever member 50 that is rotatable about an axis of a rotation shaft 21 between the lever type connector 1 and a housing 20 including the frame member 30 and the hood member 40, and applies a connector fitting force or a connector extraction force accompanying the rotation to the mating connector 501 (FIGS. 1 to 7). In the housing 20 exemplified here, the rotation shaft 21 is provided in the frame member 30 (FIG. 4). The frame member 30 has two rotation shafts 21 coaxially protruding in opposite directions on the frame main body 31. The rotation shaft 21 protrudes from two outer wall surfaces parallel to each other in the frame main body 31.

The lever member 50 is made of an insulating material such as synthetic resin. The lever member 50 includes arm portions 51 rotatable around an axis of the rotation shaft 21 and an operation portion 52 connected to the arm portions 51 (FIGS. 1 to 7). The operation portion 52 is arranged at end portions of moment arms of the arm portions 51 at a position farthest from the rotation shaft 21 with the rotation shaft 21 as a rotation center, and acts as a force point of the moment arms at the time of lever operation.

The lever member 50 exemplified here includes two arm portions 51 arranged to face each other at an interval in the axial direction of the rotation shaft 21 (FIGS. 1 to 4). The arm portion 51 has a through hole 51*a* as a bearing that pivotally supports the rotation shaft 21 at one end (FIGS. 1, 2, and 4). In the lever member 50, the other ends of the two arm portions 51 are connected by the operation portion 52 (FIGS. 1, 2, and 4).

The operation portion 52 includes an operation subject 52*a* that connects the other ends of the two arm portions 51, and an operation support portion 52*b* that causes the operation subject 52*a* to protrude and is capable of hooking fingers of an operator at the time of lever operation (FIGS. 1 to 7). The operation support portion 52*b* is provided substantially at a center between the two arm portions 51, and for example, provided with a plurality of steps which can be easily hooked by the fingers of the operator.

In addition, the lever member 50 includes an insertion/extraction support structure 53 that acts a connector fitting force with the mating connector 501 by rotating the housing 20 around the axis of the rotation shaft 21 in one direction from the first lever position (FIGS. 1 and 5) when the connectors are in the insertable/extractable state to the second lever position (FIG. 6) when the connectors is in the completely fitted state, and acts the connector extraction force with the mating connector 501 by rotating the housing 20 in the other direction from the second lever position (FIG. 6) to the first lever position (FIGS. 1 and 5) around the axis of the rotation shaft 21 (FIGS. 1, 2, and 4 to 7).

Figure 5:
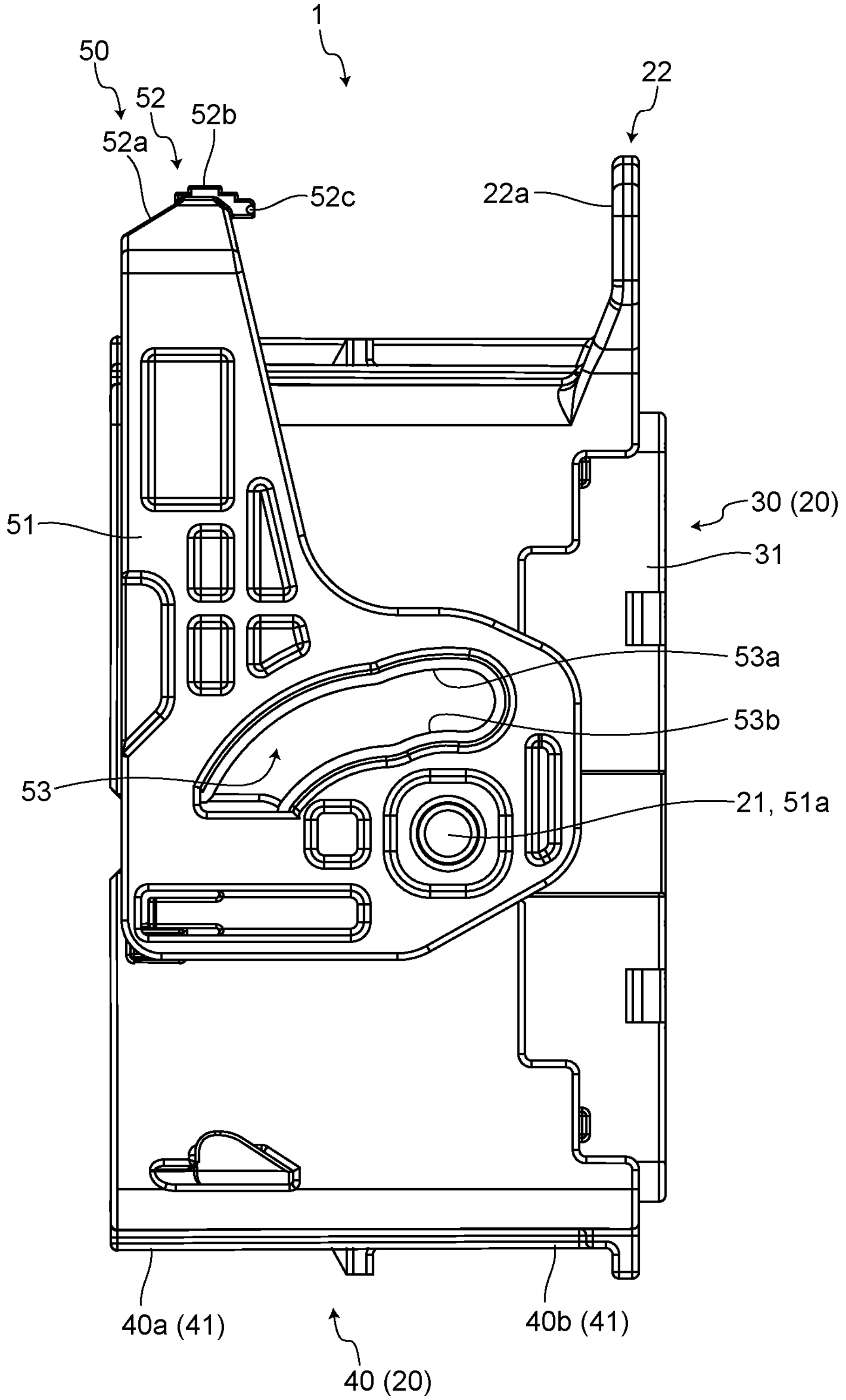
FIG. 5 is a plan view of the lever type connector at a first lever position as viewed from a side.
Figure 6:
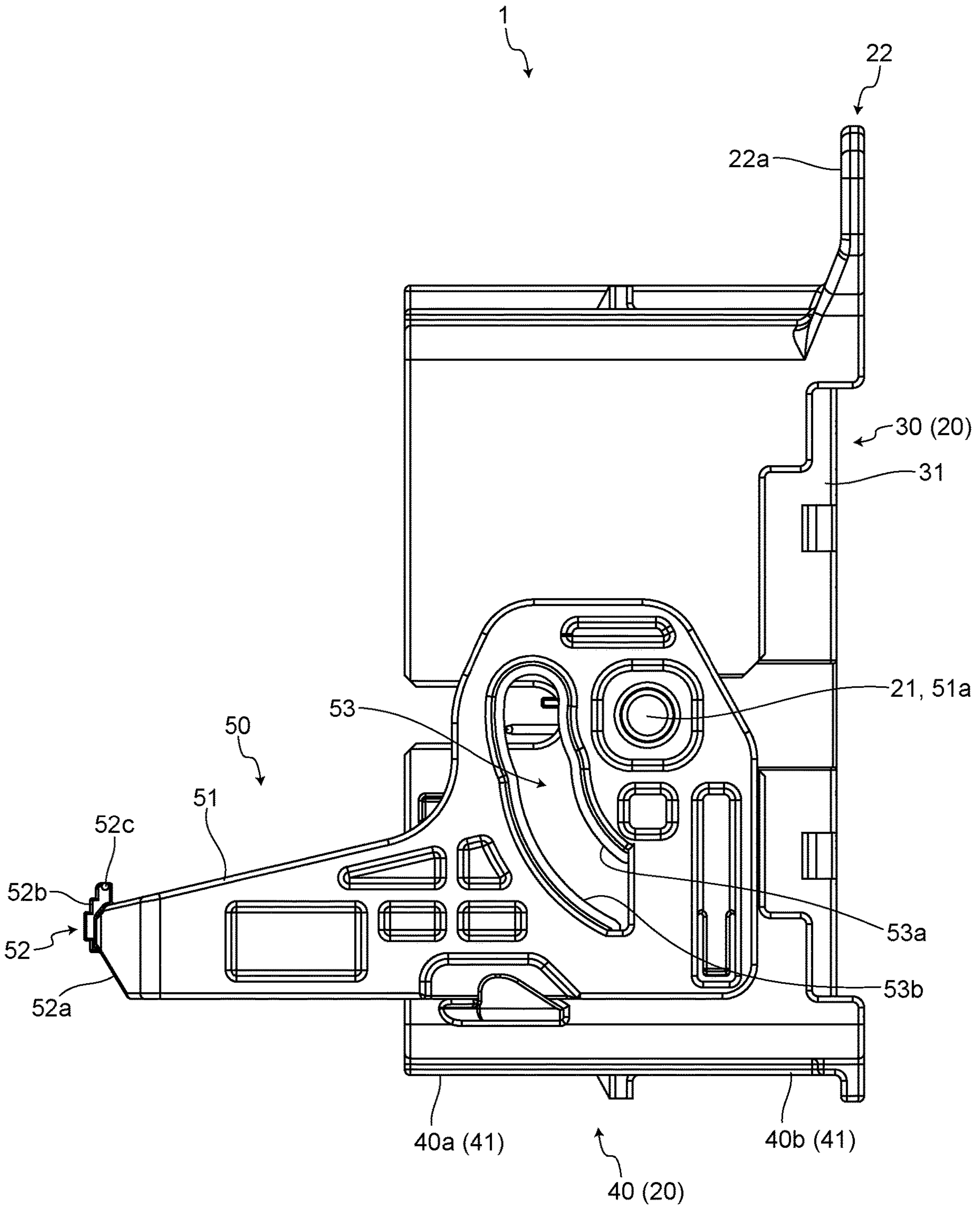
FIG. 6 is a plan view of the lever type connector at a second lever position as viewed from the side.

In the lever type connector 1, when the lever member 50 is at the first lever position, the hood member 40 is disposed at the first hood position with respect to the frame member 30 (FIGS. 1 and 5). In the lever type connector 1, when the lever member 50 is at the second lever position, the hood member 40 is disposed at the second hood position with respect to the frame member 30 (FIG. 6).

The insertion/extraction support structure 53 is a through hole provided between one end and the other end of the moment arm in the arm portion 51, and is provided for each arm portion 51. The two insertion/extraction support structures 53 are arc-shaped through holes having the same projected shape projected in the axial direction of the rotation shaft 21 and protruding toward the other end side of the arm portion 51. The through holes 51*a* (rotation shaft 21) are disposed closer to one end side of the arm portions 51 than the insertion/extraction support structure 53.

A guide shaft 511 of the mating connector 501 that receives the connector fitting force or the connector extraction force from the lever member 50 is inserted into the insertion/extraction support structure 53 (FIG. 1). The insertion/extraction support structure 53 guides the guide shaft 511 between one end and the other end in the circumferential direction in conjunction with lever operation. The guide shaft 511 slides while being guided by the insertion/extraction support structure 53, and receives a connector fitting force or a connector extraction force from the insertion/extraction support structure 53. The guide shaft 511 is provided on the mating frame member 530. The guide shaft 511 illustrated here protrudes from two outer wall surfaces parallel to each other in the mating frame member 530. The two guide shafts 511 protrude coaxially in directions opposite to each other.

Between the connectors, the lever member 50 is rotated from the first lever position toward the second lever position in the insertable/extractable state, so that the guide shaft 511 is guided from one end to the other end of the insertion/extraction support structure 53 along the first inner wall surface 53*a* while pushing and moving the guide shaft 511 by the arc-shaped outer first inner wall surface 53*a* of the insertion/extraction support structure 53 with the rotation (FIGS. 1, 2, and 4 to 7). Between the connectors, a connector fitting force is generated by a pressing force acting on the guide shaft 511 from the first inner wall surface 53*a* of the insertion/extraction support structure 53, and the connectors relatively move from the insertable/extractable position to the completely fitted position.

In addition, between the connectors, the lever member 50 is rotated from the second lever position toward the first lever position in the completely fitted state, so that the guide shaft 511 is guided from the other end to one end of the insertion/extraction support structure 53 along the second inner wall surface 53*b* while pushing and moving the guide shaft 511 by the arc-shaped inner second inner wall surface 53*b* of the insertion/extraction support structure 53 with the rotation (FIGS. 1, 2, and 4 to 7). Between the connectors, a connector extraction force is generated by the pressing force acting on the guide shaft 511 from the second inner wall surface 53*b* of the insertion/extraction support structure 53, and the connector extraction force relatively moves from the completely fitted position to the insertable/extractable position.

In the lever type connector 1, the lever member 50 is temporarily held by the housing 20 across a position where the lever member 50 is rotated from the first lever position to the side opposite to the second lever position, thereby protecting the lever member 50 during conveyance or in a state of being detached from the mating connector 501. Therefore, the housing 20 has a lever protection portion 22 that locks the operation portion 52 at the lever protection position across a position where the lever member 50 is rotated from the first lever position to the side opposite to the second lever position and prevents the lever member 50 from excessively rotating across the lever protection position (FIGS. 1 to 7 and 9).

Figure 7:
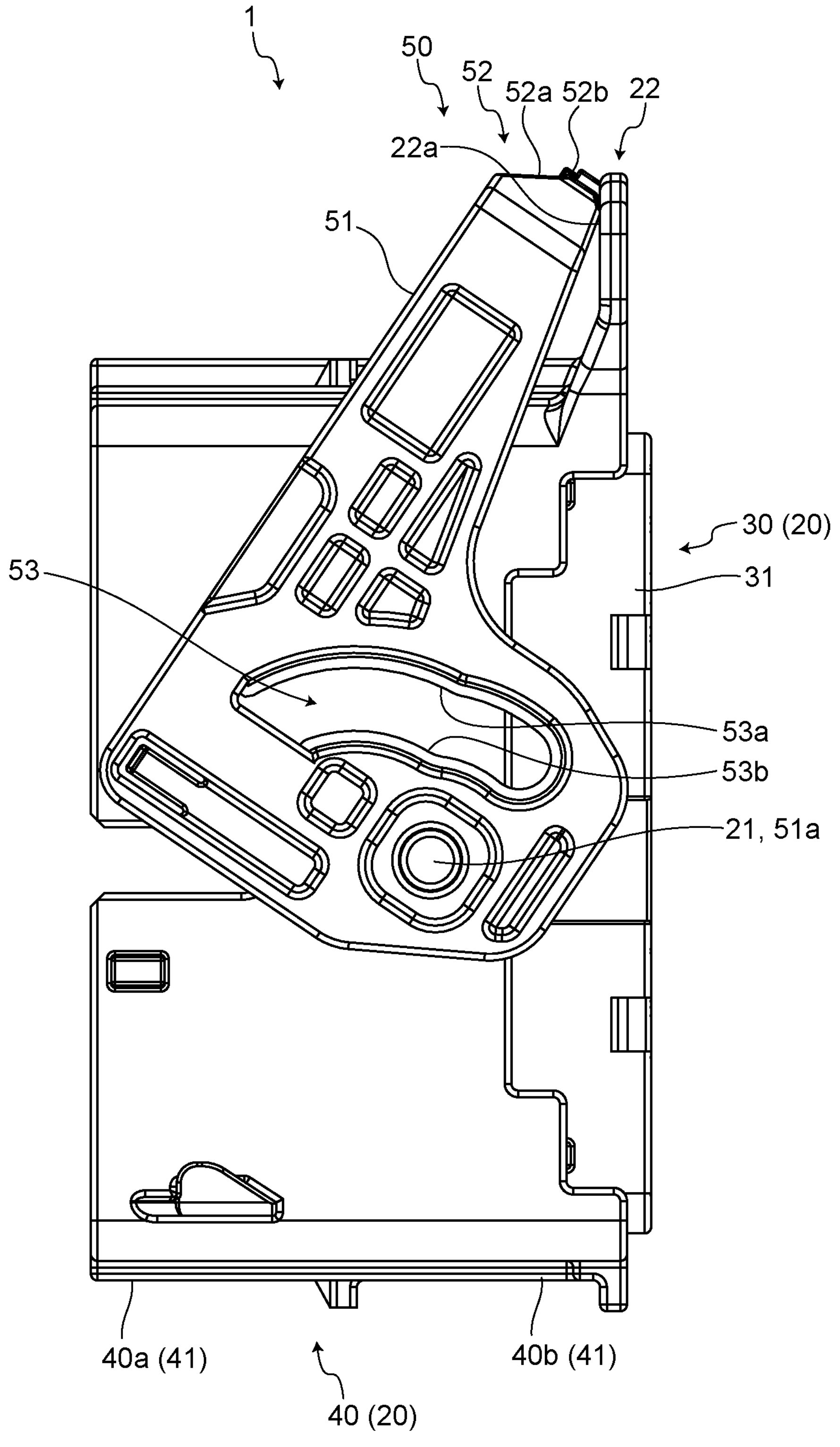
FIG. 7 is a plan view of the lever type connector at the lever protection position as viewed from the side.

In the lever type connector 1, when the lever member 50 is at the lever protection position, the hood member 40 is disposed at the first hood position with respect to the frame member 30 (FIG. 7).

The lever protection portion 22 has a first lever locking wall 22*a* that locks the operation subject 52*a* of the operation portion 52 on a front surface side when the lever member 50 is rotated from the first lever position to the side opposite to the second lever position, to suppress excessive rotation of the lever member 50 across the lever protection position (FIGS. 1, 4 to 7, and 9). In the lever protection portion 22 illustrated here, for convenience, a side of the operation portion 52 facing the operation subject 52*a* along with the rotation of the lever member 50 is referred to as a front surface. The lever protection portion 22 is formed in a plate shape, and has one wall surface on the front surface side facing the operation subject 52*a* as the first lever locking wall 22*a*. Therefore, the lever protection portion 22 is formed to have a plate thickness that is not bendably deformed by a force received by the first lever locking wall 22*a* from the operation subject 52*a*.

Figure 3:
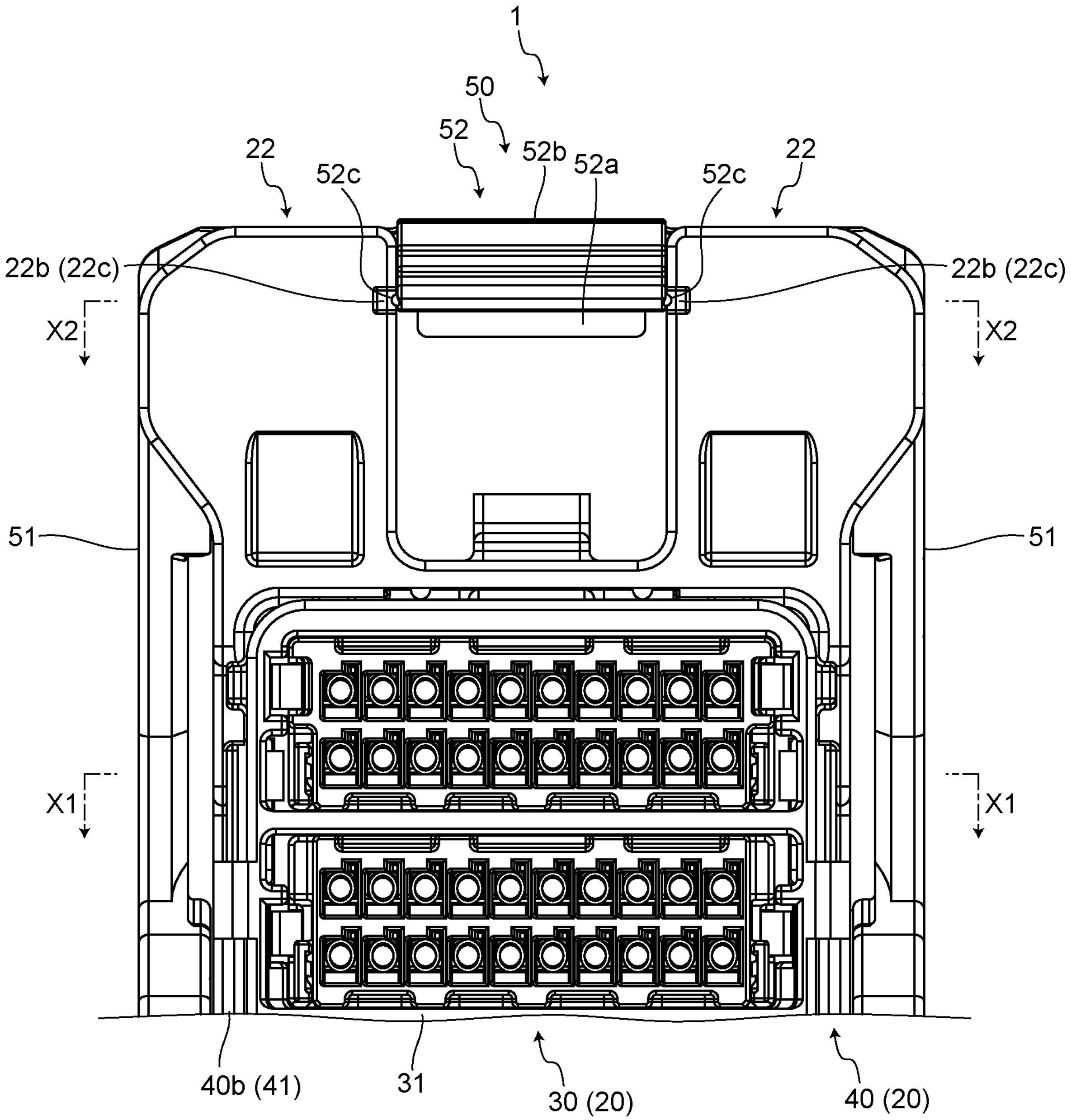
FIG. 3 is a partially enlarged view of the lever type connector at the lever protection position as viewed from a back side.
Figure 9:
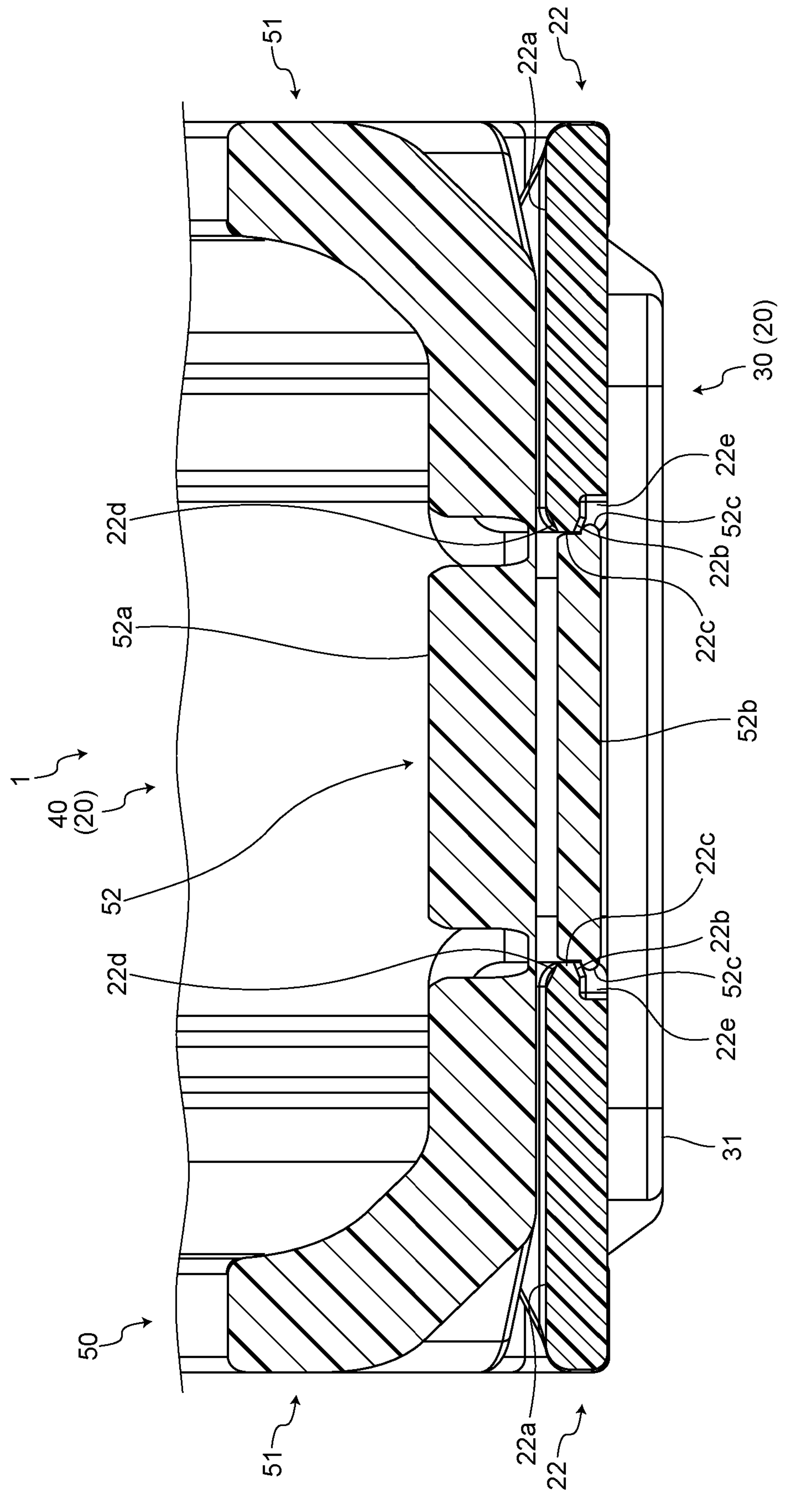
FIG. 9 is a partially enlarged view illustrating a cross section taken along line X2-X2 in FIG. 3.

The housing 20 has a pair of lever protection portions 22. In the housing 20, the pair of lever protection portions 22 is disposed at an interval in the axial direction of the rotation shaft 21. The pair of lever protection portions 22 protrudes from the frame housing portion 40*b* of the hood member 40. The lever member 50 locks each arm portion 51 side of the operation subject 52*a* to the first lever locking wall 22*a* of each lever protection portion 22 at the lever protection position, and causes the operation support portion 52*b* to enter between the lever protection portions 22 (FIGS. 3 and 9).

In the lever type connector 1, the protection function of the lever member 50 by the lever protection portion 22 is maintained by stopping the lever member 50 at the lever protection position. Therefore, a temporary holding structure for holding the lever member 50 in the housing 20 at the lever protection position is provided between the housing 20 and the lever member 50. This temporary holding structure is provided between the lever protection portion 22 of the housing 20 and the operation portion 52 of the lever member 50.

The operation portion 52 includes a first holding portion 52*c* (FIGS. 1, 3, 4, and 9). The first holding portion 52*c* is formed in a protruding shape by the operation portion 52. The first holding portion 52*c* illustrated here protrudes in a protruding shape from the operation support portion 52*b*. The first holding portion 52*c* is provided for each lever protection portion 22. The first holding portion 52*c* in this example protrudes in directions opposite to each other from the respective axial end surfaces of the rotation shaft 21 in the operation support portion 52*b*. Here, the first holding portion 52*c* is formed as a hemispherical projection.

In addition, the lever protection portion 22 has a second holding portion 22*b* that locks the first holding portion 52*c* at the lever protection position and stops the lever member 50 at the lever protection position (FIGS. 1, 3, 4, and 9).

Figure 10:
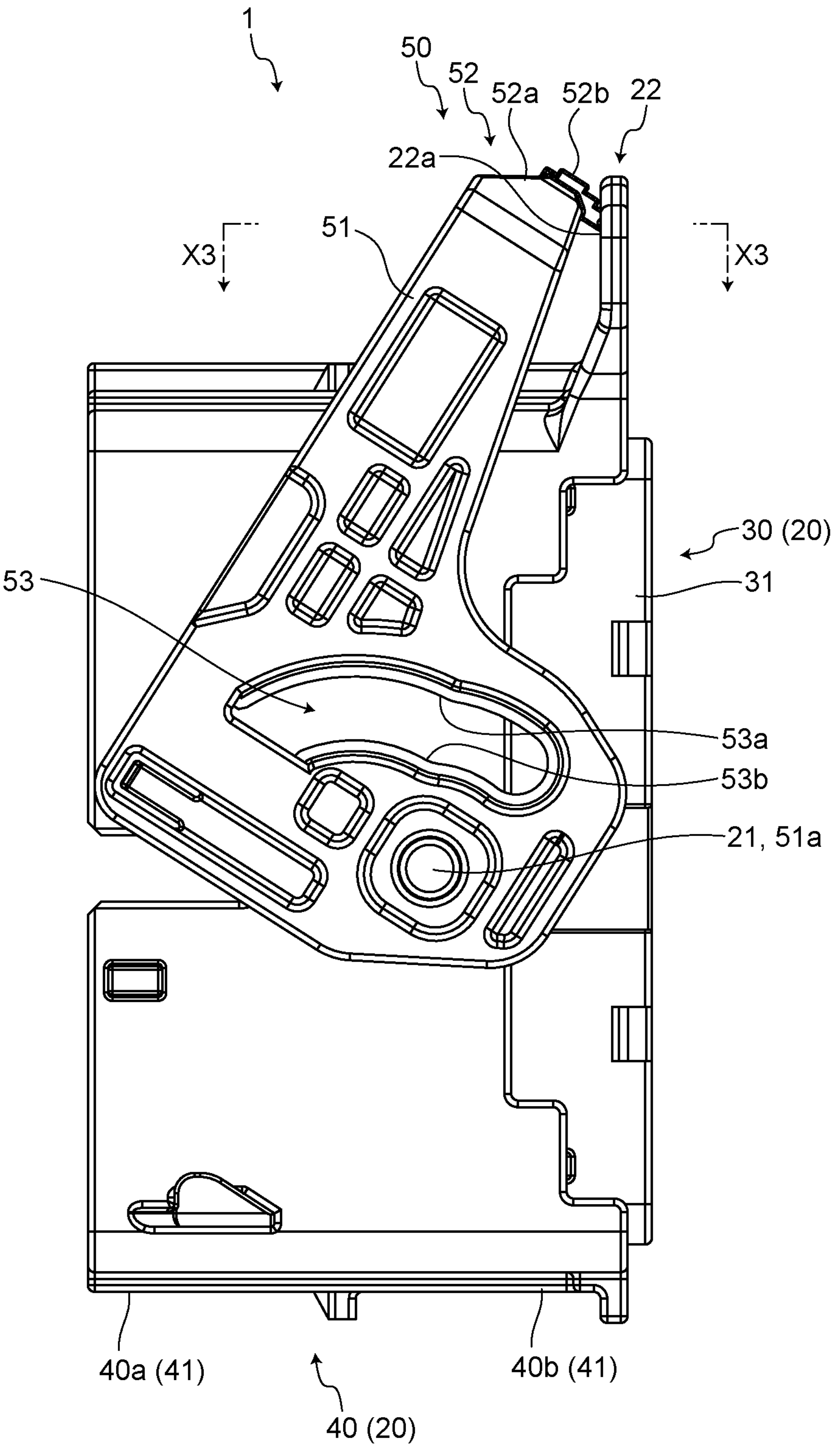
FIG. 10 is a plan view of the lever type connector when the first holding portion abuts on a pressing wall of a flexible portion as viewed from the side.
Figure 11:
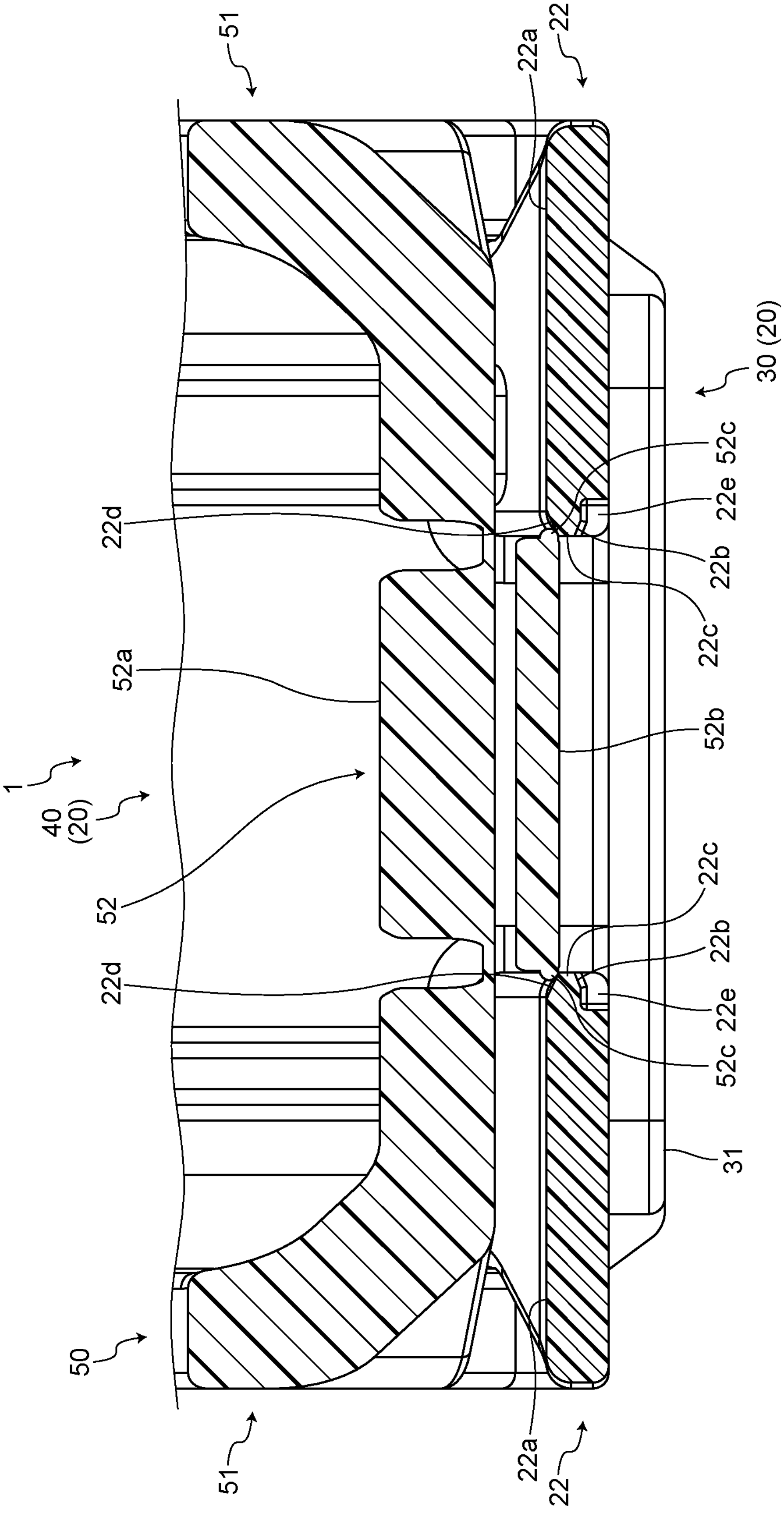
FIG. 11 is a partially enlarged view illustrating a cross section taken along line X3-X3 in FIG. 10 rotated by 90 degrees.

Specifically, the lever protection portion 22 includes a flexible portion 22*c* that is bent by a pressing force from the first holding portion 52*c* of the lever member 50 rotated from the first lever position toward the lever protection position, and cancels the bending together with climbing over the first holding portion 52*c* toward a back surface side (FIGS. 1, 3, 4, and 9). When the lever member 50 is rotated from the first lever position toward the lever protection position, the first holding portion 52*c* abuts on the flexible portion 22*c* on the front surface side of the lever protection portion 22 before the operation subject 52*a* of the operation portion 52 abuts on the first lever locking wall 22*a* (FIGS. 10 and 11). Therefore, at that time, the flexible portion 22*c* has a pressurization wall 22*d* on a front surface side with which the first holding portion 52*c* abuts and receives a pressing force from the abutting first holding portion 52*c* (FIGS. 1, 4, and 9 to 11). The first holding portion 52*c* further rotates the lever member 50 toward the lever protection position to bend the flexible portion 22*c* while applying the pressing force to the pressurization wall 22*d*, and moves the flexible portion 22*c* to a back surface side of the lever protection portion 22. The flexible portion 22*c* has a second lever locking wall 22*b* as the second holding portion 22*b* which is a wall located on a back side of the pressurization wall 22*d*, and locks the first holding portion 52*c* climbing over the back side and stops the lever member 50 at the lever protection position.

For example, an outer peripheral edge of the lever protection portion 22 is provided with a groove portion 22*e* that is partially recessed from the back surface side and into which the first holding portion 52*c* enters at the lever protection position, and a flexible portion 22*c* having a groove bottom of the groove portion 22*e* as the second lever locking wall 22*b* (FIGS. 1, 4, and 9 to 11). The flexible portion 22*c* is formed in a piece shape having a plate thickness thinner than that of the lever protection portion 22.

In the lever type connector 1, a place where the first holding portion 52*c* climbs over the flexible portion 22*c* is defined as a lever protection position. Therefore, the operation subject 52*a* is brought into contact with the first lever locking wall 22*a* when the first holding portion 52*c* climbs over the flexible portion 22*c*. Therefore, in the lever member 50, at the lever protection position, the excessive rotation across the lever protection position is suppressed by the operation subject 52*a* of the operation portion 52 and the first lever locking wall 22*a* of the lever protection portion 22, and the rotation from the lever protection position to the first lever position is suppressed by the first holding portion 52*c* of the operation portion 52 and the second lever locking wall 22*b* as the second holding portion 22*b* in the lever protection portion 22. Therefore, in the lever type connector 1, the lever member 50 can be held at the lever protection position, and even if an unnecessary force is applied due to collision of a peripheral component with the lever member 50 at the lever protection position, the lever member 50 can be protected by the lever protection portion 22.

Here, in the lever type connector 1, the first holding portion 52*c* is provided in the operation portion 52 of the lever member 50, and the first holding portion 52*c* is locked to the second holding portion 22*b* (second lever locking wall 22*b*) of the lever protection portion 22. That is, in the lever type connector 1, the lever member 50 is held by the lever protection portion 22 by a temporary holding structure (first holding portion 52*c*, second holding portion 22*b*) at a place close to a force point of the moment arm in the lever member 50. Therefore, in the lever type connector 1, for example, the holding force in the temporary holding structure can be reduced as compared with a case where the lever member is held by the housing at a place away from the force point of the moment arm. Therefore, in the lever type connector 1, a force applied to the temporary holding structure (first holding portion 52*c*, second holding portion 22*b*) can be reduced when the lever member 50 is moved between the first lever position and the lever protection position, as compared with that case. Therefore, in the lever type connector 1, since durability of the temporary holding structure can be improved, the holding force of the lever member 50 at the lever protection position can be continuously maintained.

In addition, in the lever type connector 1, in order to move the protruding first holding portion 52*c* of the lever member 50 to the back surface side of the lever protection portion 22 and lock the first holding portion 52*c* to the second holding portion 22*b* (second lever locking wall 22*b*) on the back surface side of the lever protection portion 22, the lever protection portion 22 is provided with the flexible portion 22*c* having flexibility. In the lever type connector 1, when the protruding first holding portion 52*c* is moved back and forth between the front surface side and the back surface side of the lever protection portion 22, the flexible portion 22*c* receiving a force from the first holding portion 52*c* is bent and deformed. Therefore, in the lever type connector 1, also in this respect, the force applied to the temporary holding structure (first holding portion 52*c*, second holding portion 22*b*) when the lever member 50 is moved between the first lever position and the lever protection position can be reduced, and the durability of the temporary holding structure (first holding portion 52*c*, second holding portion 22*b*) can be improved, so that the holding force of the lever member 50 at the lever protection position can be continuously maintained.

In the lever type connector according to the present embodiment, the first holding portion is provided in the operation portion of the lever member, and the first holding portion is locked to the second holding portion of the lever protection portion. That is, in the lever type connector, the lever member is held by the lever protection portion by the temporary holding structure (first holding portion, second holding portion) at a place close to a force point of the moment arm in the lever member. Therefore, in this lever type connector, for example, the holding force in the temporary holding structure can be reduced as compared with a case where the lever member is held by the housing at a place away from the force point of the moment arm. Therefore, in this lever type connector, the force applied to the temporary holding structure (first holding portion, second holding portion) can be reduced when the lever member is moved between the first lever position and the lever protection position, as compared with that case. Therefore, in the lever type connector according to the present embodiment, since a durability of the temporary holding structure can be improved, a holding force of the lever member at the lever protection position can be continuously maintained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lever type connector, comprising:

a terminal fitting;

a housing that accommodates the terminal fitting; and a lever member that is rotatable around an axis of a rotation shaft between the lever member and the housing and applies a connector fitting force or a connector extraction force accompanying the rotation between the lever member and a mating connector, wherein the lever member includes an arm portion rotatable around the axis of the rotation shaft, an operation portion as a force point connected to the arm portion and disposed at an end portion, at a position farthest from the rotation shaft, of a moment arm of the arm portion with the rotation shaft as a rotation center, and an insertion/extraction support portion that causes the connector fitting force to act on the mating connector by rotating the lever member in one direction around the axis of the rotation shaft from a first lever position when the lever type connector and the mating connector are in a fittable state and in an extractable state to a second lever position when the lever type connector and the mating connector are in a completely fitted state, and causes the connector extraction force to act on the mating connector by rotating the lever member in another direction around the axis of the rotation shaft from the second lever position to the first lever position, the housing includes a lever protection portion that locks the operation portion at a lever protection position across a position where the lever member is rotated from the first lever position to a side opposite to the second lever position and prevents the lever member from excessively rotating across the lever protection position, the operation portion includes a first holding portion, the lever protection portion includes a second holding portion that locks the first holding portion at the lever protection position and stops the lever member at the lever protection position, the lever protection portion includes a first lever locking wall that locks an operation subject of the operation portion on a front surface side to suppress excessive rotation of the lever member across the lever protection position, and a flexible portion that is bent by a pressing force from the first holding portion in the lever member rotated from the first lever position toward the lever protection position and cancels the bending together with climbing over of the first holding portion toward a back surface side, the operation subject is brought into contact with the first lever locking wall when the first holding portion climbs over the flexible portion, and the flexible portion includes a pressurization wall on the front surface side that receives the pressing force from the first holding portion when the lever member is rotated from the first lever position toward the lever protection position, and a second lever locking wall as the second holding portion that is a wall located on a back side of the pressurization wall and locks the first holding portion that climbs over on a back surface side to stop the lever member at the lever protection position.

2. The lever type connector according to claim 1, wherein the lever protection portion is formed in a plate shape having one wall surface on the front surface side as the first lever locking wall, and an outer peripheral edge of the lever protection portion is provided with a groove portion that is partially recessed from the back surface side and into which the first holding portion enters at the lever protection position, and the flexible portion having a groove bottom of the groove portion as the second lever locking wall.

3. The lever type connector according to claim 1, wherein the operation portion includes an operation support portion capable of hooking a finger of an operator at the time of lever operation, the operation support portion protrudes from the operation subject, and the first holding portion protrudes in a protruding shape from the operation support portion.

4. The lever type connector according to claim 2, wherein the operation portion includes an operation support portion capable of hooking a finger of an operator at the time of lever operation, the operation support portion protrudes from the operation subject, and the first holding portion protrudes in a protruding shape from the operation support portion.

5. The lever type connector according to claim 1, wherein the housing includes a second lever protection portion that locks the operation portion at a lever protection position across a position where the lever member is rotated from the first lever position to a side opposite to the second lever position and prevents the lever member from excessively rotating across the lever protection position, the operation portion includes a third holding portion, and the second lever protection portion includes a fourth holding portion that locks the third holding portion at the lever protection position and stops the lever member at the lever protection position.

6. The lever type connector according to claim 2, wherein the housing includes a second lever protection portion that locks the operation portion at a lever protection position across a position where the lever member is rotated from the first lever position to a side opposite to the second lever position and prevents the lever member from excessively rotating across the lever protection position, the operation portion includes a third holding portion, and the second lever protection portion includes a fourth holding portion that locks the third holding portion at the lever protection position and stops the lever member at the lever protection position.

* * * * *